United States Patent [19]
Hornbostel, Jr.

[11] 3,961,328
[45] June 1, 1976

[54] DETECTION SYSTEM

[75] Inventor: Lloyd H. Hornbostel, Jr., Beloit, Wis.

[73] Assignee: Center for Management Services and Applied Research, Beloit, Wis.

[22] Filed: Aug. 5, 1974

[21] Appl. No.: 494,987

Related U.S. Application Data

[62] Division of Ser. No. 368,609, June 11, 1973, abandoned.

[52] U.S. Cl................................ 340/420; 340/229
[51] Int. Cl.$^2$......................................... G08B 17/04
[58] Field of Search .......... 340/229, 227, 240, 242, 340/420; 137/72, 73, 74, 75; 116/106

[56] References Cited
UNITED STATES PATENTS 3,772,671  11/1973  Owen................................. 340/229
3,851,321  11/1974  Stitt................................... 340/229

Primary Examiner—Harold I. Pitts
Attorney, Agent, or Firm—Melvin F. Jager

[57] ABSTRACT

An alarm system comprising an elongate and flexible pressure line adapted to be charged with a selected line pressure; switching means coupled to the line and responsive to a pressure change in the line to create alarm signal; union means inserted in frictional sealing engagement within said line and having a bore which maintains the fluid continuity of the line; and spring-biased retaining means circumscribing said line and applying a selected clamping force to seal said union means in said line. The union means are arranged to break the seal of the line in response to an emergency condition, to thereby lower the line pressure and activate an alarm.

3 Claims, 10 Drawing Figures

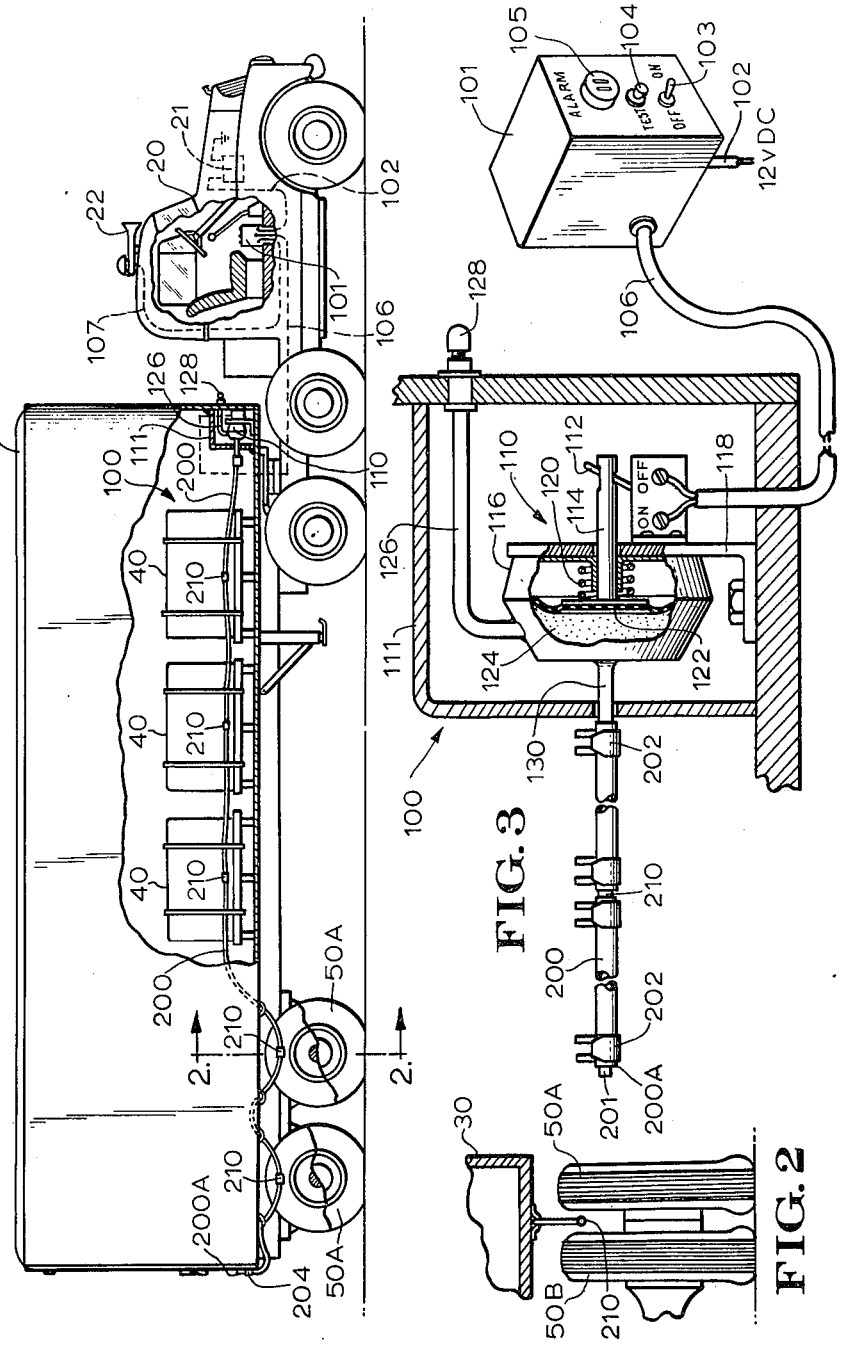

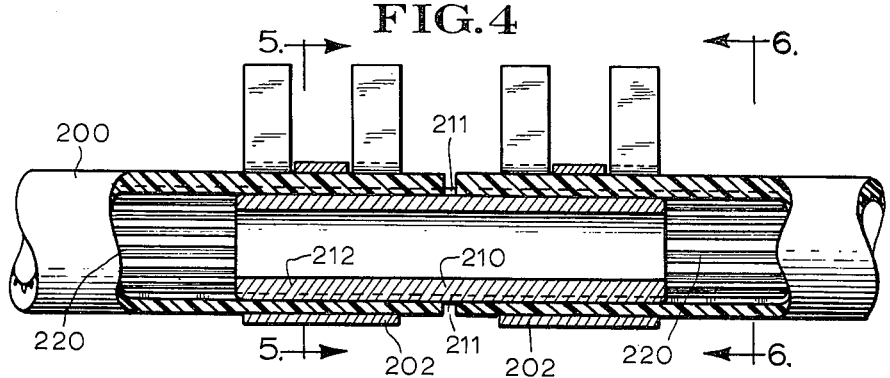
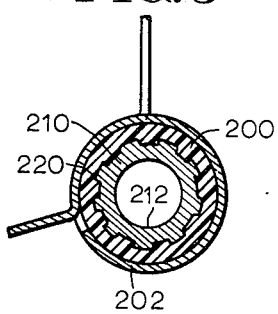
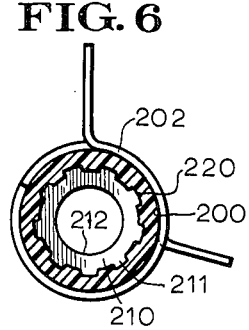
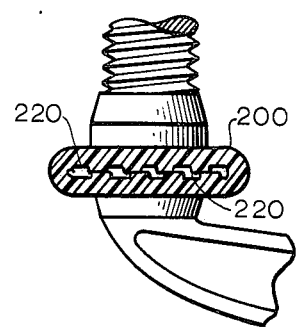
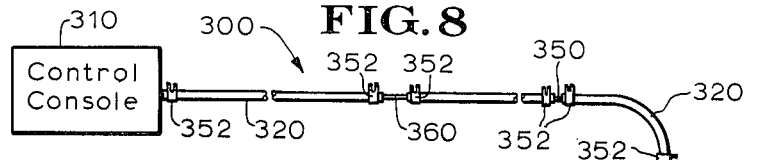
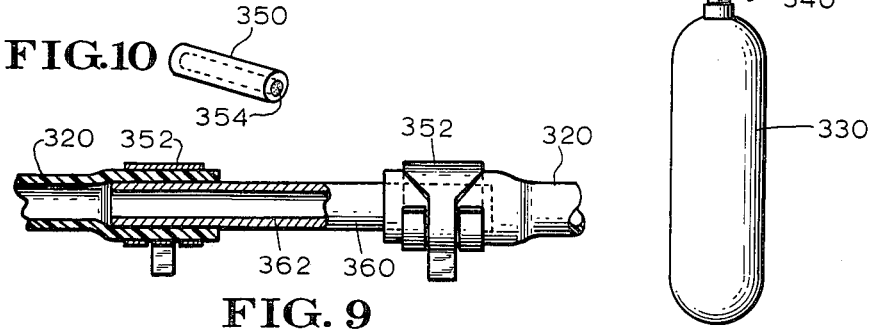

DETECTION SYSTEM

This is a division of application Ser. No. 368,609 filed June 11, 1973, and now abandoned in favor of continuation application Ser. No. 595,874, filed July 14, 1975.

BACKGROUND AND GENERAL DESCRIPTION

This invention relates to an improved system for detecting the existence of emergency conditions, such as an undesirable shifting of attempted theft of products from truck beds, warehouses or the like, or the occurence of a fire hazard.

There is a need for a simple and inexpensive detection system which will create a warning signal when an emergency condition exists, and which can be readily reactivated for further use after the emergency condition has passed. For instance, the customary shipment of products in open or accessible truck beds has created a substantial pilferage and theft problem. Even the largest equipment on a truck bed is subject to theft if the truck includes no detection system. Truck operators are also constantly subjected to the danger of shifting loads during transit. In addition, there are many installations requiring a simple and fail-safe system for detecting the existence of an undesirable heat build-up which would create a fire hazard. There is also a need to provide a monition and fire detection system that is essentially non-electrical, so that no substantial electrical power supply is needed to maintain the detection system in operation.

Accordingly, the principle object of this invention is to provide a simple, economical and reliable detection system which will meet the above needs. Generally, the system comprises a pressure line which is extended throughout the material or the area to be guarded. The line is charged with a suitable pressurized fluid, such as nitrogen or compressed air to establish a selected line pressure. Break unions of special design are provided at selected locations in the line. In one embodiment, the break unions are designed to disconnect from the line upon the application of a predetermined force to the line to thereby reduce the line pressure and activate an alarm incorporated within the system. In a second embodiment the break unions are designed to be fusible links which break the line and thereby reduce the line pressure by melting at a selected temperature level. In accordance with this invention the unions are readily replaceable, so that the line can be recharged, and the alarm system reactivated, after the emergency condition has passed.

More specifically, the alarm system in accordance with this invention includes an elongate pressure line constructed from a flexible material such as polyethelyne. The line has a central opening which is sealed in a fluid-tight condition, and is charged with a pressurized fluid to establish a selected line pressure. A pressure-responsive switch is included in the system and is maintained in an inactive position under normal conditions. When an emergency condition occurs and the line pressure is reduced, the switch responds to the pressure change by moving into an alarm position and thereby activates a suitable visual or audible alarm. A plurality of break unions, including a bore which maintains the fluid continuity of the line, are spaced at selected points along the line. Spring-biased retaining means apply a selected clamping force to the line adjacent the unions to seal the unions in the line. The unions respond to the application of a selected force to the line, or to the existence of a predetermined temperature level, to break the seal of the line and thereby activate the alarm incorporated within the system.

BRIEF DESCRIPTION OF THE DRAWINGS

Further features and advantages of the present invention will become more apparent from the following description of several embodiments thereof, taken in conjunction with the accompanying drawings, in which:

FIG. 1 is an elevational view of the detection system in accordance with this invention adapted to provide a warning system in the trailer truck;

FIG. 2 is a cross-sectional view taken along the line 2—2 of FIG. 1 illustrating the portion of the detection system arranged to signal the occurrence of a flat tire in a dual wheel assembly;

FIG. 3 is an enlarged and removed cross-sectional view of the control console embodied in the detection system illustrated in FIGS. 1 and 2;

FIG. 4 is an enlarged cross-sectional view of a break union incorporated at selected points within the warning system illustrated in FIGS. 1–3;

FIG. 5 is a cross-sectional view taken along the line 5—5 in FIG. 4;

FIG. 6 is a cross-sectional view taken along the line 6—6 in FIG. 4;

FIG. 7 is an enlarged schematic view illustrating the effects of compressing the flexible tubing included in the detection system in accordance with the present invention;

FIG. 8 is a schematic representation of a fire detection system in accordance with this invention;

FIG. 9 is an enlarged partial cross-sectional view of the fusible unions incorporated within the fine detection system illustrated in FIG. 8; and FIG. 10 represents a perspective view of a bleed orifice included in the fire detection system illustrated in FIG. 8.

DESCRIPTION OF THE PREFERRED EMBODIMENT

Referring generally to the drawings, FIGS. 1 through 6 illustrate the detection system in accordance with this invention adapted to be used in a trailer truck assembly to warn against unusual occurrences, such as load shifting, theft and tire blowouts. As seen in FIG. 1, the illustrated truck assembly includes a cab 20 and a trailer body 30. The load carried by the truck is represented by the loaded pallets 40 positioned within the truck body 30. Typical dual rear wheel assemblies for the truck body 30 are illustrated in FIGS. 1 and 2 by the dual wheels 50A and 50B. The truck cab 20 is also provided with a conventional horn 22.

The detection system in accordance with this invention is generally indicated by the reference numeral 100. As seen in FIG. 3, the system 100 includes an alarm console 101. The console 101 is connected to an energy source, such as the truck battery 21 (FIG. 1) by a suitable electrical connector 102. The console 101 includes an electrical off/on switch 103 for activating the system 100, and a press-on reset button 104 for testing and resetting the system 100, as explained further below. The console 101 further includes an alarm outlet connection 105. The connection 105 can be connected in any suitable manner to a warning system, such as the truck headlights or the horn 22, so that the warning system is activated when the detection system 100 is triggered. In the illustrated embodiment the connection 105 is electrically coupled to the truck horn 22 by the connector 107.

As indicated in FIG. 3, an electrical connector 106 joins the control console 101 to a dashpot and switch assembly 110. As seen in FIG. 1, the dashpot and switch assembly 110 preferably is housed at a suitable location in the front of the body 30 within a protective housing 111. The housing 111 should be of strong construction to prevent thieves or vandals from tampering with the dashpot and switch assembly 110, and to prevent damage to the assembly 110 from shifting loads within the body 30.

As further seen in FIG. 3, the assembly 110 includes an electrical on/off switch 112 which is coupled to the electrical connection 106. The switch 112 also is mechanically coupled to the movable plunger 114 of a dashpot 116. The dashpot 116 is located within the housing 111 in a stationary position on a brace 118. The dashpot 116 includes a compression spring 120 which biases the plunger 114 in a selected direction (to the left in FIG. 3). The spring 120 in the illustrated embodiment constantly urges the plunger 114 into a position which retains the switch 112 in an "on" position. A flexible diaphragm 122 divides the interior of the dashpot 116, and defines a sealed fluid chamber 124.

As seen in FIG. 3, the sealed fluid chamber 124 is adapted to receive a pressurized fluid, such as compressed air or nitrogen, from an external source. When the chamber 124 is subjected to a selected pressure, a force is applied to the flexible diaphragm 122, and the diaphragm is urged in a set direction. In this embodiment the force of the pressurized fluid in the chamber 124 urges the diaphragm 122 to the right in FIG. 3 against the biasing force of the spring 120. The fluid pressure in the chamber 124 thereby urges the plunger 114 to the right in FIG. 3, and maintains the electrical switch 112 in the "off" position.

If the pressure is diminished or removed from the chamber 124, the spring 120 will urge the diaphragm 122 and the plunger 114 to the right in FIG. 3, and thereby move the switch 112 from the "off" position to the "on" position. Such motion activates the electrical alarm console 101 when the control switch 103 is in the "on" position. The electrical circuitry in the console 101 then energizes a warning device, such as the horn 22.

The dashpot 116 also includes a charging line 126 in coupled relationship with the pressure chamber 124. As seen in FIG. 3, the line 126 extends through the casing 111, and preferably through the wall of the truck trailer 30. By this arrangement the line 126 can be utilized to charge the chamber 124 with pressurized fluid, such as compressed air, from the exterior of the truck body 30. If compressed air is used as the pressurized fluid, the terminal end of the charging line 126 is provided with the usual air valve and cap assembly 128 to prevent leakage from the line 126 and the chamber 124. Compressed air is the preferred form of charging fluid for the detection system 100 because of the readily available supply of compressed air in the tires on the truck assembly. Thus, a small air hose (not shown) can be carried on the truck to charge the system 100 by bleeding air from a tire.

As indicated in FIG. 3, the detection system 100 in accordance with this invention also includes a fluid outlet coupling 130 connected to the dashpot 116. The coupling 130 is in fluid communication with the pressure chamber 124 in the dashpot and extends through the wall of the housing 111. The coupling 130 is adapted to receive the open end of a pressurized fluid detection line 200. The detection line 200 is formed from hollow flexible tubing, such as polyethylene. During the operation of the detection system 100, the interior of the line 200 is maintained charged at a fluid pressure substantially equal to the fluid pressure in the dashpot chamber 124. The line 200 has a free end 200A which is sealed with a fluid-tight plug 201. The opposite end of the line 200 is connected to the coupling 130, in a fluid-tight arrangement. The outside diameters for the plug 201 and the coupling 130 are selected to equal the inside diameter of the pressure line 200, within a close tolerance, so that the ends of the line 200 are sealed. In addition, the system 100 includes spring clips 202 which circumscribe the line 200 at the coupling 130 and the plug 201. The spring tension, diameter and area of the clips 202 are chosen to exert a selected sealing pressure against the charged line 200, to thereby provide a fluid-tight seal between the line and the plug 201 and coupling 130. By this arrangement, the line 200 can be charged with a pressurized fluid, such as compressed air, and will be maintained at substantially the same pressure as contained in the dashpot pressure chamber 124. The line 200 and the dashpot chamber 124 are simultaneously charged with the compressed air through the inlet valve 128.

As seen in FIG. 1, the detection line 200 is adapted to be extended through the trailer body 30 in any desired arrangement. For example, after the truck body 30 is loaded, the detection line can be strong through the palletized loads 40, and suspended between the dual rear wheels 50A and 50B. The free end 200A of the line 200 is then secured at the rear of the truck body 30 by a clamp 204, or the like, in a manner which eliminates any substantial slack in the line.

In accordance with this invention, as seen in FIG. 1, the pressurized line 200 is provided with a plurality of break unions 210. The unions 210 are stationed at locations along the line 200 where movement of the line 200 to be detected. The unions 210 are arranged to disconnect the line 200 when the line is subjected to a selected degree of movement, such as when the palletized loads 40 shift; when a thief attempts to remove the load; or when the line 200 is moved by occurrence of a blowout of one of the dual tires 50A or 50B.

When line 200 is fractured, the pressure in the line is relieved, and the pressure in the chamber 124 of the dashpot 110 is reduced. The spring 120 then will drive the plunger 114 to activate the alarm switch 112 from the "off" position to the "on" position. The control console 101 thereby triggers an alarm, such as the truck horn 22, to signal that the line 200 has been broken by some unusual occurrence.

The preferred arrangement for the line 200 and the break unions 210 is illustrated in FIGS. 4–7. The line 200 is extruded from a flexible plastic, such as polyethylene, in a manner which forms interior splines 220. As seen in FIG. 6, the splines 220 are uniformly spaced around the interior of the line 200 and extend the length of the line 200. The splines 220 prevent potential thieves or vandals from tampering with the line 200 in an attempt to overrule the alarm control console 101, such as by attempting to clamp the line 200 at a point upstream from any union 210, so that the breakage of the line at the union would not activate the alarm system. As shown in FIG. 7, the splines 220 preclude the line 200 from being sealed fluid-tight by compression from a clamping mechanism, since the splines cannot be sealed by compression of the flexible line. The line 200 will therefore continue to function by bleeding pressurized fluid from the line through the splines 220 upon the breakage of the line at any union 210.

As seen in FIGS. 4 and 5, each of the unions 210 comprises a metallic hollow cylinder having an outside diameter equal to the internal diameter of the line 200, within a close tolerance. Moreover, each union 210 is constructed from splined stock so that the splines 211 on the union are substantially identical in size and location to the splines 200 provided in the line 200. The unions 210 thus can be inserted at any point in the pressure line 200. The union splines 211 will also seal the splines 220 in the line against leakage at the break unions 210. The unions 210 further include a bore 212 which permits the passage of pressurized fluid through the unions.

As seen in FIG. 4, the break unions 220 are inserted into the free ends of aligned portions of the line 200. The compatability of the union splines 211 with the line splines 220 allows the unions to be inserted at any desired location along the length of the line 200. The spring clips 202 are placed on the line 200 adjacent each end of the unions 210 after the unions are inserted in the line. The spring tension, internal diameter and contact area of the clips 202 are co-ordinated with the diameters of the line 200 and unions 210 to apply a selected connecting pressure between the free ends of the line 200 and the union 210.

Generally, the clips 202 are dimensioned to seal the unions 210 into the line 200 in a fluid-tight arrangement, so that the pressurized fluid in the line 200 will not leak from the joints between the line 200 and the unions under normal conditions. However, the clips 202 will release the line 200 from the unions 210, by allowing the line to slide out of engagement with the unions, when the line is subjected to an unusual amount of force. The unusual force loads on the line 200 will be created by events such as a substantial shifting of the loads 40 in the truck body 30; an attempt by a thief or vandal to remove the loads 40 from the truck; or a blowout and collapse of the tires 50A or 50B against the line 200 suspended therebetween.

In the preferred arrangement of the detection system 100, the dashpot 110 is designed to be activated, and to move the switch 112 from an "off" to an "on" position, at a pressure of about 12 psi or less. A pressure in the line 200 and the chamber 124 greater than 12 psi will hold the switch 112 in the "off" position. Thus, the system 100 is energized by charging the chamber 124 and the line 200 with a fluid pressure of 25–30 psi. A pressure of 25–30 psi in the system 100 is preferred to overcharge the system and accommodate for any small loss of pressure resulting from minor leaks.

In accordance with this invention, this 25–30 psi charging pressure is readily available by connecting the charging valve 128 with the valve on any of the truck tires by means of a suitable air line (not shown). The compressed air in the tire, which is normally in the 25–30 psi range, will be bled into the line 200 and the chamber 124 to charge the system 100. The volumetric capacity of the system 100 is relatively small in a typical truck alarm installation, so that the charging of the system 100 from the truck tire will not materially deflate the tire.

In the preferred embodiment including a pressure of 25–30 psi in the system 100, the spring clips 202 are designed to allow the line 200 to part at the location of a break union 210 at a force load equivalent to a pressure of about 45–50 psi in the system 100. As described above, a break in the line 200, and the attendant loss of line pressure, will activate the dashpot 110 and the alarm console 101. After the emergency or the like has passed, the system 100 can be re-armed by reconnecting the separated break union 210 and recharging the system through the air pressure from a tire or other suitable source.

FIGS. 8, 9 and 10 illustrate a second embodiment of this invention adapted to detect fires or undesirable heat buildup, and to sound an appropriate alarm. The fire detection system 300 operates on the same basic principle as the above-described alarm system 100, in that the system 300 responds to the loss of air in a closed system. The system 300 includes a control console 310 designed to detect the loss of air in the system and respond by closing a suitable electrical relay (not shown) that has contacts normally held in an open position, and thereby trigger an alarm device. The preferred control console 310 includes a switch that is set to remain in an "off" or deactivated condition at about 20 psi, and is capable of being activated to an "on" position when the sensed pressure drops to 15 psi or lower. A suitable console switch that satisifies the above characteristics is currently marketed by Texas Instruments, Inc., under their trademark "KLIXON". The alarm device may be any audible or visual device, such as bells, lights, or a direct phone connection to a fire or police department switchboard. The console 31 should be located in an isolated area remote from any fire hazard and convenient to the connected alarm device. The electrical energy to activate the console 310 and the alarm device may be derived from the conventional AC power supply available at the location or from a self-contained battery system. The amount of energy consumed by the system 310 is minimal, since the system is activated only during testing or when a fire hazard has been detected.

As seen in FIG. 8, the control console 310 is coupled in fluid communication with the remote end of a closed flexible detection line 320. As described above, the line 320 is constructed from a suitable flexible plastic material, such as polyethylene. To install the system 300, the line 300, the line 320 is strung throughout the room or plant or the like which is to be guarded against fire, and is secured in place by suitable fasteners which will not pinch or puncture the line. The coupling between the line 320 and the console 310 is accomplished through a pressuresensitive dashpot, such as the dashpot 110 illustrated in FIG. 3, so that the console 310 is activated by a selected drop in pressure in the line 320. A spring clip 352, similar to the above-described clips 202, couples the line 320 to the control console 310 in a fluid-tight arrangement.

The line 320 can be charged with a pressurized fluid, such as compressed air, by means of a compressor or the like. However, in the preferred embodiment the fire detection system 300 includes a pressurized charging tank 330 joined to one end of the pressure line 320 with a spring clip 352. The tank 330 contains an inert fluid such as compressed air or nitrogen, under a selected pressure. Suitable gauges (not shown) can be provided on the tank 330 to indicate the pressure level in the detection system 300 and the residual pressure in the tank 330. A control valve 340 continuously connects the tank 330 to the detection line 320 and permits manual regulation of the flow of pressurized fluid from the tank into the line. The continuous connection of the line 320 to the tank 330 provides a constant source of pressurized fluid for the system 300 and thereby compensates for any minor fluid leaks which may develop in the system.

The system 300 also is provided with a bleed orifice 350 to control the rate of charging the line 320 from the tank 330. The bleed orifice 350 comprises a length of tubular stock which is positioned in the line 320 by means of spring clips 352. As seen in FIG. 10, the interior of the bleed orifice 350 is formed from a sintered metal core 354. The core 354 is designed to have a porosity which produces a selected rate of flow of the pressurized fluid from the tank 330 into the line 320. As explained further below, the bleed orifice 350 thereby restricts the amount of pressurized fluid reentering the line 320 from the tank 330 after the system 300 has been activated by the detection of a fire hazard.

In order to detect the presence of a fire hazard, the system 300 in accordance with this invention includes a plurality of fusible melt unions 360. The unions 360 are inserted in the pressure line 320 at strategic points, such as in the line near electrical junction boxes or the like, where a potential fire hazard exists. As seen in FIG. 9, each of the unions 360 is cylindrical in configuration, and includes a hollow central bore 362 which allows the fluid in the line 320 to flow through the unions from the tank 330 to the control console 310. A pair of spring clips 352 secure the union 360 in place within the free ends of a break in the pressure line 320. Moreovoer, a space is provided between the free ends of the line 320, as seen in FIG. 9, so that a substantial portion of the melt union 360 is exposed to the heat of the surrounding atmosphere. By this arrangement, a fire hazard which raises the temperature of the surrounding atmosphere to a selected degree will melt the adjacent union 360 and break the continuity of the pressure line 320. A drop in line pressure caused by such a line break will activate the control console and thereby trigger a fire alarm.

It has been found that the construction and installation of the melt unions 360 is crucial to the proper functioning of the alarm system 300. Each union 360 must melt and break the pressure line 320 when the temperature reaches a selected range. At the same time, each union 360 must include a bore 362 to maintain the continuity of the line 320, and must be installed in a substantially sealed relationship in the line 320. The unions 360 are preferably formed from a fusible metal such as ROSE'S alloy, which melts at a temperature between 120° F and 180° F, in order to provide the proper response to hazardous fire conditions.

However, the softness and malleability of the union 360, necessary to produce the proper response to heat, create manufacturing and installation problems. For instance, normal drilling techniques to produce the bore 362 in each of the unions 360 create a temperature level that tends to melt the union 360 before the drilling is completed. It has been found that the bore 362 can be produced effectively if the melt union 360 is first chilled in liquid nitrogen for about 60 seconds. The nitrogen chilling stores enough heat sink capability in the union 360 to allow the drilling of the bores 362 to be completed without melting or distorting the union.

In addition, the softness of the metal alloy unions 360 creates problems in securing the unions in a sealed relationship in the pressure line 320. Conventional clamping techniques to join the line 320 to the unions 360 created a pressure which elongated or deformed the unions, and threatened to restrict the flow through the union bore 362 and to cause pressure leaks at the juncture between the unions and the line 320. It has been found that the deformation of the unions 360 can be eliminated, and a tight seal maintained between the union and the line 320, by proper co-ordination of the tension and size of the spring clips 352, the relative size of the line 320 and unions 360 and the pressure in the line 320. For instance, the preferred dimensions for the line 320 are about 3/16 inches in internal diameter and 5/16 inches in external diameter. The melt union 360 is preferably ¼ inch in external diameter, and the bore 362 is ⅛ inch. The melt unions 360 are inserted into the line 320, with the aid of a suitable lubricant, and thereby stretch the internal diameter of the line 320 by 1/16 of an inch. The stretching of the line 320 creates a uniform compression force on the engaged ends of the unions 360 that is sufficient to seal the juncture from pressure leaks but not sufficient to deform the unions. In addition, the preferred pressure in the line 320 is about 25 psi, and the spring clips 352 are preferably designed to apply a tension or clamping force of about 12 psi at about ⅜ of an inch in diameter. This arrangement produces a holding force which will secure the unions 360 in the line 320 against leaks and will maintain the shape of the unions.

The design of the system 300 in accordance with this invention also allows the response characteristics of the unions 360 to be varied within a selected range by varying the diameter of the bores 362. For instance, if the union 360 is located in a critical area, such as an electrical junction box, where a rise in temperature in an immediate indication of a fire hazard, the bore 362 in the union can be enlarged. A relatively large bore 362 in the union 360 will decrease the size of the wall section forming the union, and will thereby make the union more sensitive to heat. Similarly, a smaller diameter for the bore 362 would be sufficient to provide the necessary response time if the union 360 is located at a high heat source, such as adjacent an oven in an industrial kitchen.

The installation of the fire detection system 300 is begun by determining the location for the heat-sensitive melt unions 360 needed to provide maximum protection against fire hazards. The control console 310 is located in a remote area away from any fire hazard, and convenient to the connected alarm system. One free end of the pressure line 320 is then coupled to the pressure sensitive switch (e.g. dashpot 110) provided in the console 310. The remainder of the line 320 is strung in a continuous fashion through the locations where the melt unions 360 are to be located. The line 320 may be secured in place by any suitable hook or fastener that does not crimp or puncture the line. Tee connections can also be added to the line 320 if needed to reach hazardous areas. The melt unions 360 are added to the line 320 before the line is finally secured in place.

The unions 360 are added to the line 320 by severing the line at the desired union location and sliding the two spring clips 352 over the free ends of the line. The union 360 is then pressed into the open ends of the line 320. As explained above, the union is approximately 1/16 inch larger than the internal diameter of the line 320 so that the line is in tight sealing engagement with the union 360. As seen in FIG. 9, the union 360 is set in the line 320 so that a substantial portion of the union is exposed to the heat of the surrounding atmosphere. In a typical installation with 1 inch unions, ¼ inch to ⅜ inch of the union should be exposed, with the ends of the union projecting an equal amount into the line 320. The spring clips 352 are then clamped over the line 320 and the ends of the union 360 to secure the union in place, and to assure a fluid-tight seal. This procedure is repeated for each union 360.

After the unions 360 are inserted in the line 320 at the needed locations, the line is charged with a pressurized fluid, such as compressed air or nitrogen, to a pressure preferably in the range of 20–25 psi. To accomplish this charging in the illustrated embodiment, the free end of the line 320 is coupled to the bleed orifice 350. As described above, the orifice 350 includes a core 354 of porous sintered metal which restricts the area through which pressurized fluid will flow into the line 320 down to 0.5% to 1.0% of the original line flow area. The orifice 350 thereby provides the system 300 with a substantially reduced recharging rate, and permits the system to be continuously coupled to the charging tank 330 through the bleed orifice. The tank 330 thus continuously applies pressure to the line 320 and compensates for any loss of line pressure through minor leakage in the system 300. The restricted area of the bleed orifice 350 prevents the pressure in the tank 330 from rapidly recharging the line 320 after a break in the line at a union 360 has signaled the existence of a fire hazard. Since the area of the orifice 350 is approximately 1% of the area of the line 320, any break at the melt unions 360 will deplete the line 320 at a flow rate which exceeds the recharge rate of flow from the tank 330 through the orifice 350.

Although the invention has been described with a certain degree of particularity, it should be understood that the present disclosure has been made only by way of example. Consequently, numerous changes in the details of construction and the combination and arrangement of components, as well as the possible modes of utilization, will be apparent to those familiar with the art. Such variations in the detection system in accordance with this invention may be resorted to without departing from the spirit and scope of the invention.

What is claimed is:

1. A break union for use in an ambient condition sensing system having a continuous fluid line comprising an elongated element for inclusion in fluid communication with said line, said element including a bore defining a fluid passage through said union and further defining a wall portion having a selected wall thickness, said element being constructed of a material capable of rupture in said wall portion when exposed to a given ambient condition, and the time required for the rupture of the wall portion, in response to said given ambient condition, being proportional to the selected thickness of said wall portion, whereby the break union response time can be varied by varying the thickness of said element.

2. The break union of claim 1 wherein said ambient condition is temperature and said element is constructed of a fusible material.

3. The break union of claim 2 wherein said element is constructed from a metallic alloy having a melting temperature approximately in the range of 120°F to 180°F whereby within such range said material will lose sufficient structural integrity so as to rupture said wall portion.

* * * * *